Feb. 18, 1930.   J. C. MONTEITH   1,747,727
SPRING ATTACHMENT
Filed Jan. 19, 1927
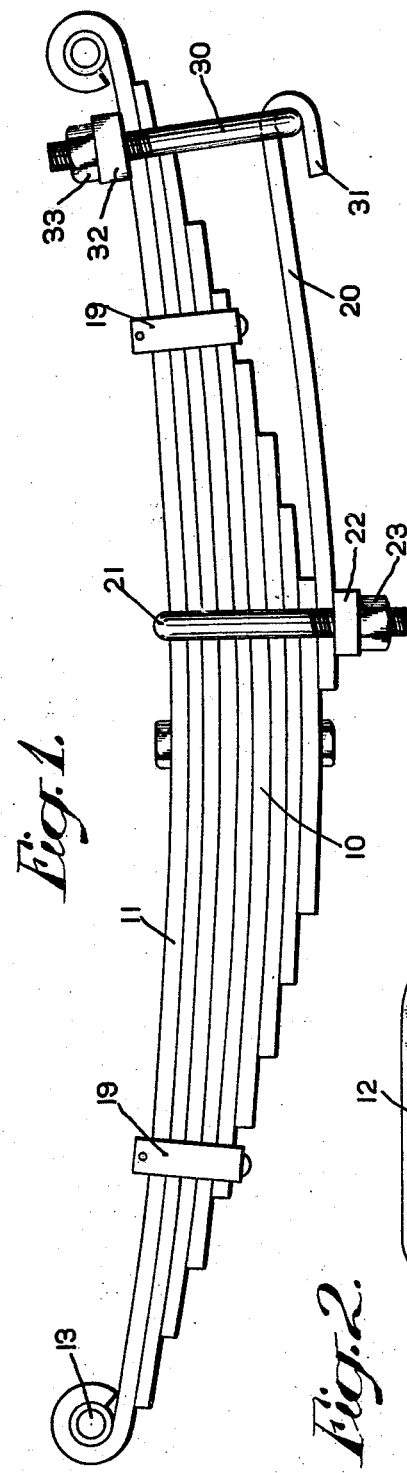
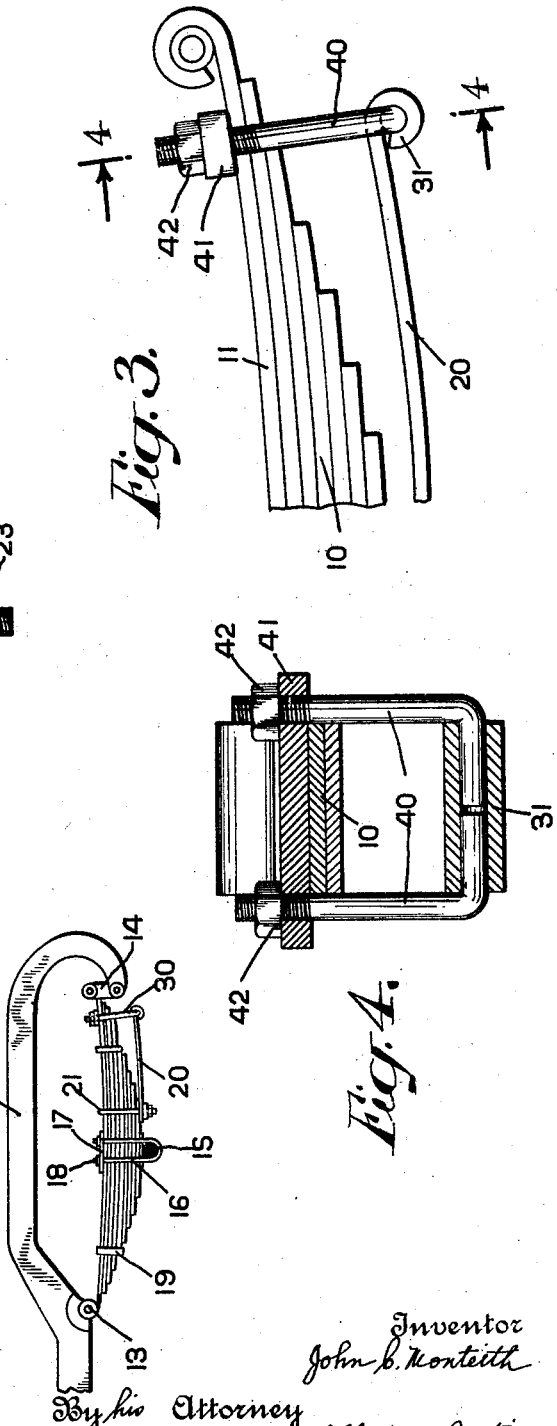
Inventor
John C. Monteith
By his Attorney
Albert M. Austin Patented Feb. 18, 1930

1,747,727

UNITED STATES PATENT OFFICE

JOHN C. MONTEITH, OF CLEVELAND, OHIO, ASSIGNOR TO THE STERLING SPRING COMPANY, OF CLEVELAND, OHIO, A CORPORATION OF DELAWARE

SPRING ATTACHMENT

Application filed January 19, 1927. Serial No. 161,977.

This invention relates to vehicle springs and more particularly to a controller therefor which may be adjustably connected to the vehicle spring, and caused to exert a false load thereon under normal conditions of use.

The invention further relates to a controller of the above mentioned type which may readily be attached to a vehicle chassis spring and adjusted with respect thereto, whereby the controller and chassis spring may be brought into a predetermined state of equilibrium.

Springs having practically identical characteristics in compression and in recoil which are capable of readily responding to road shocks will also transmit the shocks directly to a vehicle chassis without material cushioning thereof. In accordance with the present invention, however, an auxiliary spring or controller is attached to a spring of the above type by being rigidly clamped thereto, and is distorted from its normal free position so as to exert a false load upon the main spring. The force exerted by the auxiliary spring is such as to limit or effectively control the recoil of the main spring and also to render the action of the spring softer in responding to road shocks.

In order to accurately control the action of the main spring, it is necessary to provide adjustable means for connecting the controller thereto and for varying the amount of initial false load applied to the main spring by the controller. This invention, therefore, provides an adjustable link connecting the free end of the controller and the free end of the main spring, said link being so designed that it may be applied to the main spring without making mechanical changes therein, and when applied may be readily accessible for purposes of adjustment.

The invention also consists in forming a product having the general characteristics, the new and useful applications, and the several original features of utility hereinafter set forth and claimed.

Although the novel features which are believed to be characteristic of this invention will be pointed out with particularity in the claim appended hereto, the invention itself, as to its objects and advantages, the mode of its operation and the manner of its organization may be better understood by referring to the following description taken in connection with the accompanying drawings forming a part thereof, in which Fig. 1 is an elevation of the controller, constructed in accordance with the present invention, showing one type of adjustable means for connecting the same to a vehicle chassis spring;

Fig. 2 is an elevation of the spring assembly attached to a vehicle chassis frame;

Fig. 3 is a fragmentary view of the chassis spring and controller, showing an alternative form of adjustable connecting means; and, Fig. 4 is a section taken on the line 4—4 of Fig. 3.

Like reference characters denote like parts in the several figures of the drawings.

In the following description and in the claims parts will be identified by specific names for convenience, but they are intended to be as generic in their application to similar parts as the art will permit.

Referring more particularly to Fig. 1, the invention is shown as applied to a vehicle chassis spring 10, comprising a plurality of leaves of progressively decreasing length, in accordance with the usual and accepted method of design in spring construction. The top leaf 11 may be extended at its ends and rolled to provide knuckles to facilitate attachment to the chassis frame 12. The spring may be attached to said frame 12 by passing a knuckle bolt 13 (Fig. 2) through one of the knuckles of said spring and a co-operating portion of the frame. The other end of said spring may be connected to frame 12 by suitable link mechanism 14, said link mechanism being pivotally attached to a knuckle of said spring and to a suitable portion of the chassis frame.

The center portion of the spring may be attached to a vehicle axle 15 by any suitable means, such as clamp comprising a U-bolt 16, which may be passed around the axle and provided with threaded ends, which are extended through suitable openings in bearing plate 17, the entire assembly being firmly clamped by means of nuts 18, which are placed upon said threaded ends. Suitable straps 19 may be employed, if desired, for preventing separation of the spring leaves during recoil.

The controller constructed in accordance with this invention comprises leaf 20, one end of which may be firmly clamped to spring 10 as by means of U-bolt 21, which is passed around the leaves of said spring 10 and provided with threaded ends which are passed through suitable holes in cross bar 22 and clamped thereto by nuts 23. Leaf 20 and U-bolt 21 are preferably designed to be attached to the leaves of the main spring without interfering with the axle or other parts which are mechanically connected thereto. Leaf 20 may be positively prevented from lateral movement by being firmly attached to cross-bar 22 by any suitable means.

The free ends of controller 20 may be connected at or near the end of spring 10 by U-bolt 30, the horizontal section of which is designated to co-operate with a slot in leaf 20 formed by bending the end 31 of said leaf back upon itself.

The ends of said U-bolt 30 are passed through cross-bar 32, which is positioned above the upper leaf of spring 10 and clamped thereto by nuts 33 threaded upon said ends. After attachment, leaf 20 may be distorted from its free position toward spring 10, by tightening nuts 33 and drawing the U-bolt upward, thereby causing leaf 20 to exert a false downward load upon the leaves of the main spring.

The false load applied by the auxiliary leaf will cause the main spring to be deflected a certain distance from its normal position, said distance depending upon the relative compression resistances of the two springs. In any case, if the springs are not acted upon by outside forces, a certain condition of equilibrium will be reached when the forces exerted by each spring upon the other spring are equal.

Referring to the construction shown in Figs. 3 and 4, controller 20 is designed to be attached to a chassis spring 10 in the manner shown in connection with Figs. 1 and 2. The adjustable connecting means, however, comprises a pair of bent bolts 40, one end of which is adapted to be inserted into a knuckle formed by rolling the end 31 of leaf 20. After bolts 40 have been thus inserted into knuckles 31, their free ends, which are bent to extend at substantially a right angle to the axis of said knuckle, are passed through suitable openings in cross-bar 41, which may be placed above and in contact with the upper leaf 11 of the main spring. The assembly may then be clamped by nuts 42, which are threaded upon the ends of said bolts 40.

After being connected as above described, and suitably adjusted to cause controller 20 and main spring 10 to be in mutual opposition, the ends of bolt 40 are prevented from becoming detached from knuckle 31 by the friction between said bolts and said knuckle and by cross-bar 41, which prevents the ends of said bolts from separating. The bolts could only be removed by a substantially parallel movement longitudinally of said knuckle, consequently by securing the free ends of the bolts, as by cross-bar 41, they are positively prevented from becoming disengaged from leaf 20.

By adjusting the connecting bolts so as to control the amount of false load applied by the controller to the main spring, the action of the main spring may be controlled at will. The riding qualities of the vehicle may be vastly improved by a suitable adjustment of the controller to cause the main spring to readily compress in response to road shocks and to be sluggish in recoil, whereby the road shocks are only transmitted to the chassis in diminished form.

In addition to the above, the spring assembly described herein possesses the further advantage, especially when applied to vehicles equipped with balloon tires, of preventing the vehicle chassis from being set into oscillation at a period which synchronizes with that of the applied road shocks. This appears to be largely due to the fact that the spring in compression possesses different characteristics than when in recoil.

Although the compression resistance of the springs, both in compression and in recoil, appears to be equal, the free period, and consequently the speed of the response of the spring to an applied force, differs under the two above conditions. The spring is readily compressible in response to a shock applied by the wheels but slow acting in recoil. The shock is therefore not transmitted to the vehicle as a severe jolt.

The successful operation of the controller depends largely upon the exact adjustment thereof with respect to the main spring. Should the properties of the main spring be known, the amount of false load required and the shackle adjustment necessary to produce this false load may be predetermined. However, when the properties of the main spring are unknown, as would be the case were the controller to be applied as an attachment to various types of assembled vehicles, it becomes necessary to apply the controller so as to have a certain predetermined distortion and then determine, by suitable adjustments during use, the exact amount of false load required to produce the most desirable riding qualities.

In the drawings accompanying and forming part of this specification, a practical commercial embodiment of the invention is disclosed, but as such illustration is primarily for purposes of disclosure, it will be understood that the structure may be modified in various respects without departure from the broad spirit and scope of the invention as hereinafter defined and claimed.

While certain novel features of the invention have been shown and described and are pointed out in the annexed claim, it will be understood that various omissions, substitutions and changes in the forms and details of the device illustrated and in its operation may be made by those skilled in the art without departing from the spirit of the invention.

What is claimed is:

A controller for vehicle chassis spring comprising a leaf spring, clamping means comprising a U-bolt for attaching one end of said leaf spring near the central portion of said chassis spring, a second U-bolt, the free end of said leaf spring being bent back parallel to itself to provide recesses having parallel sides and an open end into which said second U-bolt may be slipped, a cross-bar above the upper leaf of said chassis spring, the free-ends of said U-bolt being extended through said cross-bar, and adjustable means for applying tension to said U-bolt, whereby said chassis spring and leaf spring may be brought into opposition and the leaf spring may be caused to suitably control the action of the chassis spring and to limit the movement thereof in recoil.

In testimony whereof I have hereunto set my hand.

JOHN C. MONTEITH.